United States Patent [19]
Thompson

[11] 3,755,877
[45] Sept. 4, 1973

[54] METHOD OF REPAIRING GEAR CUTTER WHEELS WITH A WELDING FIXTURE AND GRINDING FIXTURE THEREFOR

[76] Inventor: Frank C. Thompson, 6642 Hythe Rd., Indianapolis, Ind. 46220

[22] Filed: Nov. 8, 1971

[21] Appl. No.: 196,596

[52] U.S. Cl. .................................................. 29/401
[51] Int. Cl. ............................................. B23p 7/00
[58] Field of Search ..................... 29/401, 426, 102, 29/103, 105; 76/101 A, 101 SM

[56] References Cited
UNITED STATES PATENTS

| | | | |
|---|---|---|---|
| 2,586,451 | 2/1952 | Wilhaber | 29/103 |
| 3,227,008 | 1/1966 | Celovsky | 29/401 |
| 3,357,279 | 12/1967 | Stolz | 76/101 A |
| 3,548,481 | 12/1970 | Bohn et al. | 29/401 |

*Primary Examiner*—Charles W. Lanham
*Assistant Examiner*—E. M. Combs
*Attorney*—C. David Emhardt

[57] ABSTRACT

A method is disclosed for repairing used gear cutter wheels. The method includes removing portions of the old used gear teeth and welding in place metal inserts. The metal inserts are then machined into final tooth form. A fixture is disclosed for holding the gear cutter wheel during the welding of the metal inserts to the cutter wheels. Another fixture is disclosed for holding the gear cutter wheel during the removal of portions of the old teeth and during the final machining of the old teeth and metal inserts.

2 Claims, 11 Drawing Figures

Patented Sept. 4, 1973

METHOD OF REPAIRING GEAR CUTTER WHEELS WITH A WELDING FIXTURE AND GRINDING FIXTURE THEREFOR

BACKGROUND OF THE INVENTION

1. Field of the Invention

This invention is in the field of fixtures and machining methods.

2. Description of the Prior Art

In the U. S. Pat. No. 2,586,451 issued to E. Wilhaber, a pair of cutters are disclosed for machining gear teeth. Continued use of the cutters disclosed in the Wilhaber patent results in the cutter teeth becoming worn so as to eventually render the cutter wheel useless. In addition, the cutting edge of the cutter wheel teeth are remachined so as to sharpen the teeth thereby further removing the material from each tooth and decreasing the life of the cutter wheel. Disclosed herein is a new method for repairing these gear cutter wheels. Metal inserts are welded to the gear cutter wheel and then remachined into final tooth form. Fixtures are disclosed to hold the gear cutter wheel during welding of the metal inserts to the gear cutter wheel and during the machining of the gear cutter wheel. A representable sample of the prior art includes the following patents which disclose fixtures for holding various workpieces: U.S. Pat. No. 3,365,843 issued to Robinson; U.S. Pat. No. 3,538,649 issued to Williams; and, U.S. Pat. No. 3,553,908 issued to Boehm. The U. S. Pat. No. 2,839,873 issued to Baxter discloses a method for making curved tooth gears whereas the U. S. Pat. No. 2,947,062 issued to Spear discloses a rotary cutter.

SUMMARY OF THE INVENTION

One embodiment of the present invention includes a method of repairing a used gear cutter wheel comprising the steps of attaching pieces of metal to the wheel; and, machining the pieces of metal into new gear cutter wheel teeth subsequent to the attaching step.

Another embodiment of the present invention is a welding fixture for a gear cutter wheel comprising a shaft, means rotatably receiving and supporting the shaft, a mounting plate fixedly mounted to an end of the shaft, the plate having a radiused protruding portion upon which the gear cutter wheel is mountable, a key mounted to the plate for locating the gear cutter wheel on the plate; and, a first retaining bar movably mounted to the plate and extending radially outward of the radiused portion to retain the gear cutter wheel on the plate.

Another embodiment of the present invention is a fixture for locating a gear cutter wheel in different positions during the machining thereof comprising a base, a holder mounted to the base and removably receiving the gear cutter wheel, first means mounted on the base to cause movement of the holder along a first line, second means mounted on the base to cause movement of the holder along a second line perpendicular to the first line, third means mounted on the base to allow rotation of the holder about an axis, and, locking means mounted on the base to lock the gear cutter wheel in different positions about the axis.

It is an object of the present invention to provide a method for repairing a gear cutter wheel.

It is the further object of the present invention to provide a fixture for holding a gear cutter wheel during the welding of metal inserts onto the wheel.

An additional object of the present invention is to provide a fixture for locating a gear cutter wheel in different positions during the machining thereof.

Related objects and advantages of the present invention will be apparent in the following description.

DESCRIPTION OF THE PREFERRED EMBODIMENTS

Figure 1:
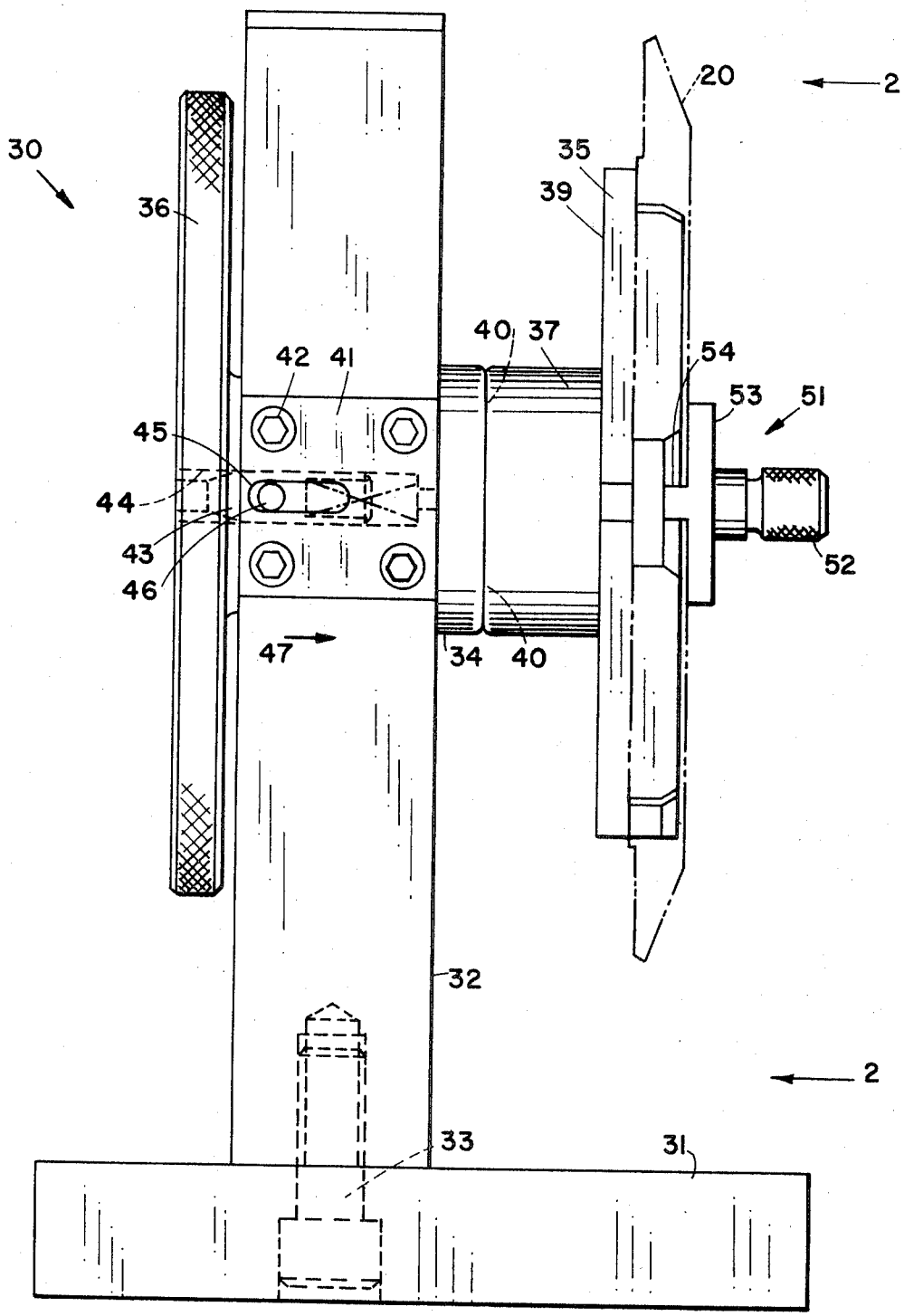
FIG. 1 is a side view of a welding fixture incorporating the present invention having a gear cutter wheel mounted thereto.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
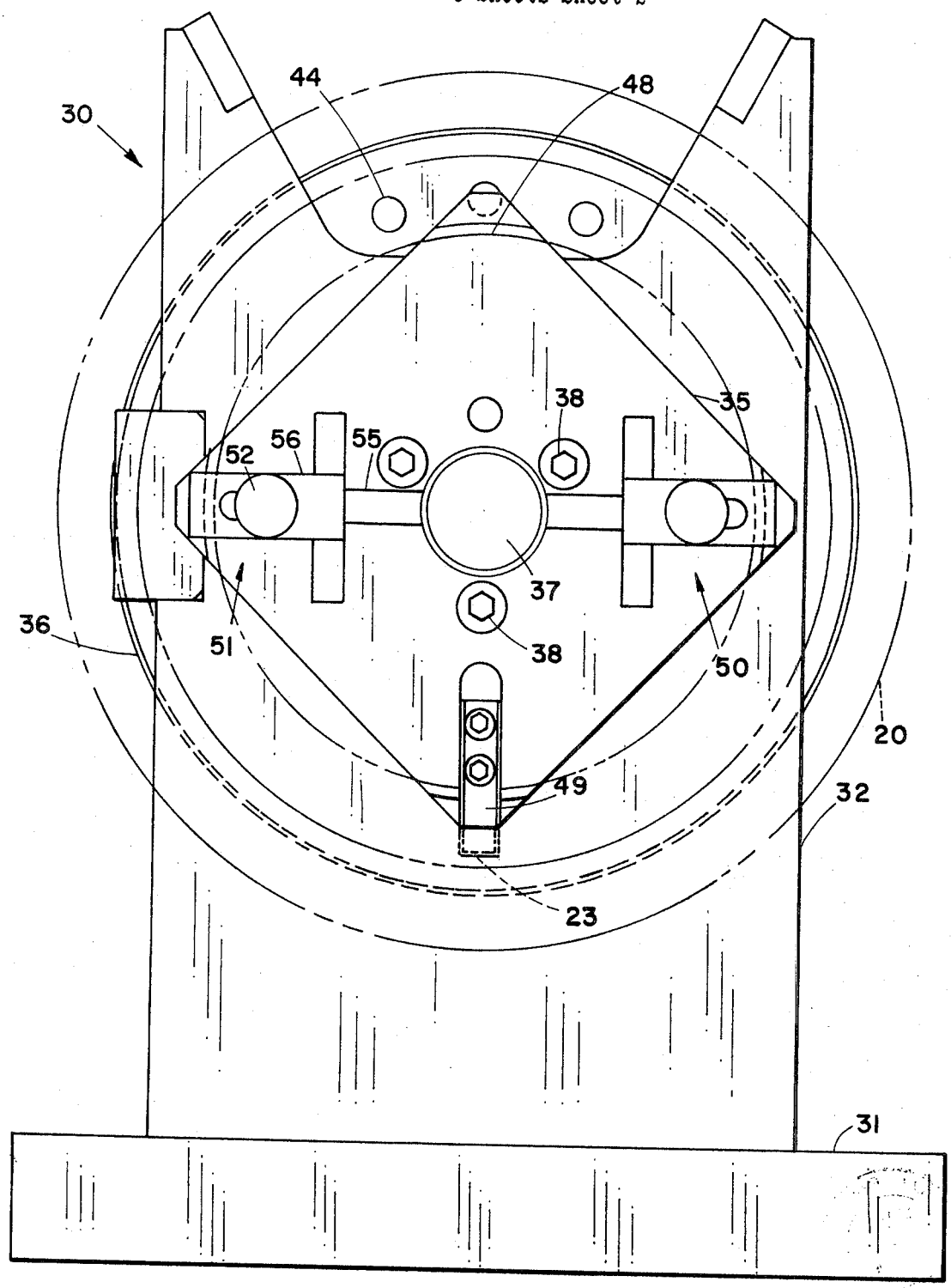
FIG. 2 is an end view of the welding fixture looking in the direction of arrows 2—2 of FIG. 1.

Referring now more particularly to FIG. 1, there is illustrated a welding fixture 30 for holding cutter 20, shown by the dashed lines, while inserts are welded to the cutter. The inserts are subsequently machined into new cutter teeth. Fixture 30 has an upright plate 32 fixedly mounted atop base plate 31 by a plurality of bolts 33. A square shaped mounting plate 35 is fixedly fastened by bolts 38 (FIG. 2) to the end of shaft 37. The diameter of shaft 37 is reduced forming a shoulder abutting against the back surface 39 of plate 35 to receive bolts 38. The diameter of shaft 37 is also reduced at location 40 so as to allow the shaft to pass through a hollow centered boss 34 which is fixedly mounted to the side of plate 32. Shaft 37 extends freely through boss 34 and plate 32 having its end fixedly fastened to a knurled wheel 36. Wheel 36 is spaced apart from plate 32 to allow rotation of the wheel. Suitable bearings may be provided in boss 34 or plate 32 so as to reduce the friction between shaft 37, the boss and plate 32 when wheel 36 is rotated in order to rotate cutter 20 mounted to plate 35.

Block 41 is mounted to plate 32 by standard fastening devices 42. A spring loaded rod 43 is slidable within block 41 with the end of the rod fitable in any one of locating holes 44 positioned around the outer portion of wheel 36. Block 41 is provided with a slot 45 with a handle rod 46 projecting therethrough and being connected to rod 43. Thus, to rotate wheel 36, rod 46 is pushed in the direction of arrow 47 thereby unlocking rod 43 from hole 44. After wheel 36 is adjusted to the appropriate position, rod 46 may be released thereby allowing rod 43 to project into a hole 44 locking the wheel 36 in place.

Figure 3:
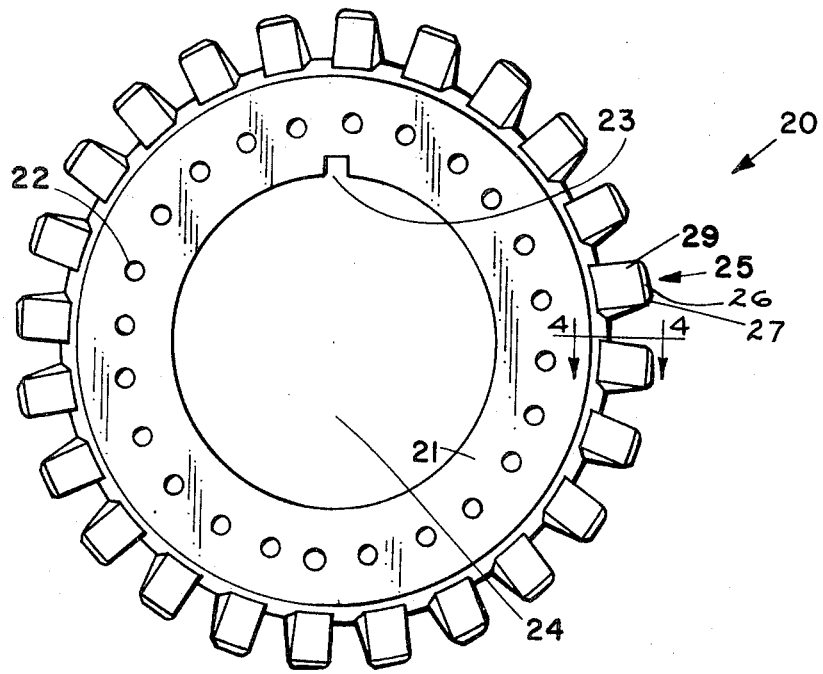
FIG. 3 is a front view of a gear cutter wheel which may be repaired according to the present invention.

The four corners of mounting plate 35 are radiused as shown at location 48 so as to facilitate the mounting of cutter 20 onto the plate. At one corner of plate 35, a locating bar 49 is positioned so as to project into a locating slot 23 provided in cutter 20 (FIG. 3). A pair of locking handles 50 and 51 are removably fastened to plate 35 for securing cutter 20 to the plate. Locking handle 51 will now be described it being understood that a similar description applies to locking handle 50. Locking handle 51 has a slotted member 56 which extends parallel with plate 35. The inner end of member 56 projects downwardly into a radial locating slot 55 provided in plate 35 whereas the opposite end 54 projects radially past the radiused corner of plate 35 so as to abut against cutter 20. Fastening device 52 extends through the slot in member 56 and is threadedly received by plate 35. Bar 53 extends across and is fastened to member 56 to facilitate grasping of the locking handle.

To mount cutter 20 onto welding fixture 30, the cutter is positioned onto plate 35 so that locating bar 49 projects into slot 23. The fastening devices of locking handles 50 and 51 are then tightened until the outer ends 54 of members 56 abut against the cutter thereby holding the cutter firmly to plate 35.

FIG. 3 shows a side view of cutter 20 which has a main body 21 with a center opening 24. A plurality of bolt holes 22 are provided in main body 21 extending around opening 24. Slot 23 is formed in main body 21 and opens into opening 24. Each tooth 25 is identical having an outer radiused edge 26 which is provided with a back relief 27 at the rear edge of each tooth. The cutting surfaces 31' of each tooth extends rearwardly from cutting edge 29'. The outer surface 30' of each tooth is beveled whereas the rear surface 29 is indented and parallel to the main body of the cutter. Cutter 20 is shown and described in the U. S. Pat. No. 2,586,451 issued to E. Wilhaber and the subject matter relative to the cutter disclosed in that patent is hereby incorporated by reference.

Figure 5:
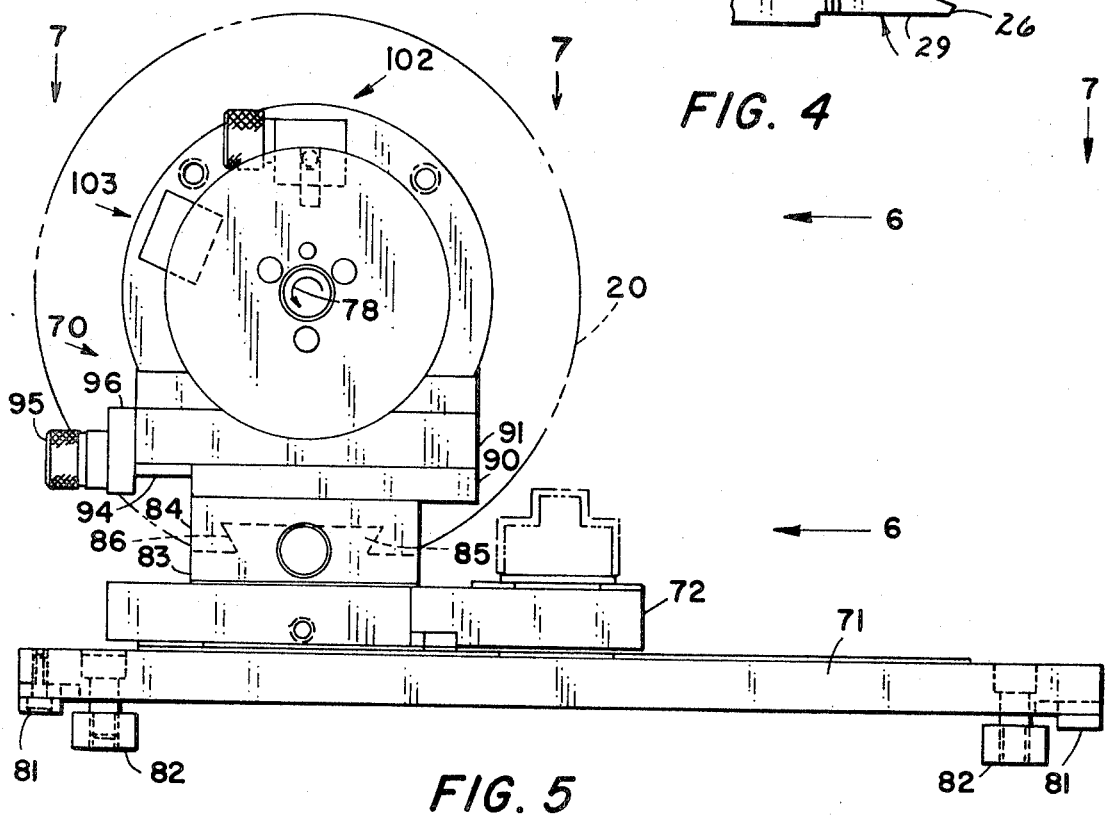
FIG. 5 is a side view of a fixture for holding a gear cutter wheel during the machining thereof.
Figure 6:
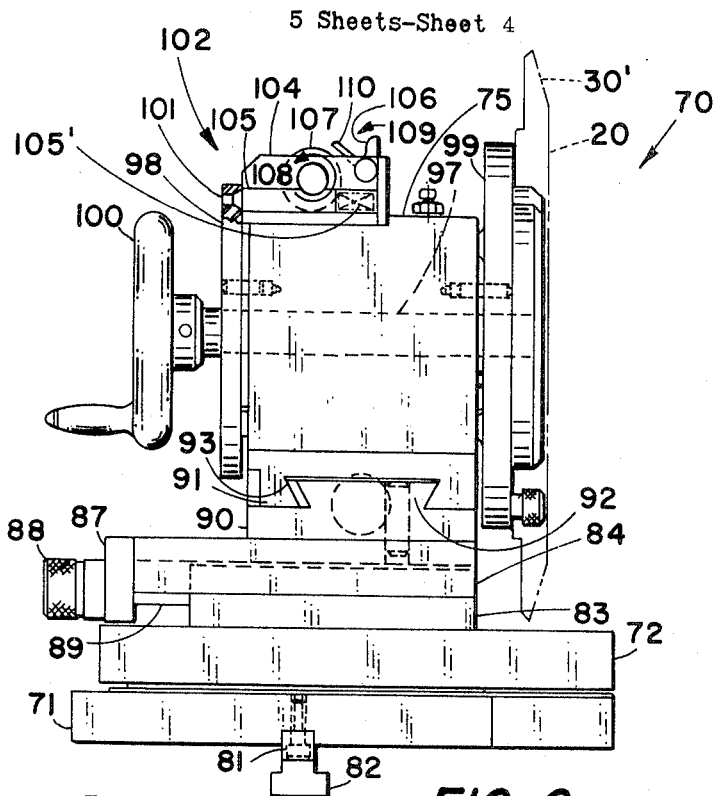
FIG. 6 is an end view of the fixture of FIG. 5 looking in the direction of arrows 6—6.
Figure 7:
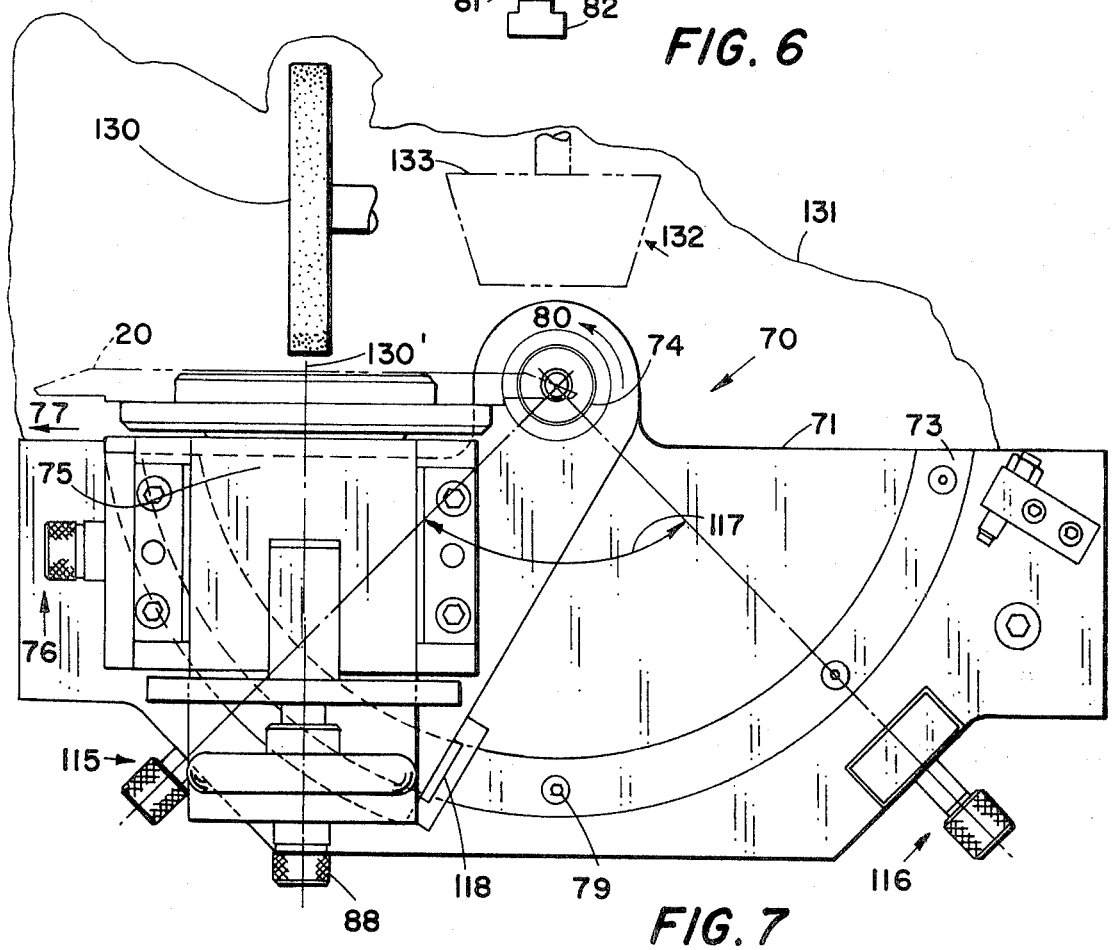
FIG. 7 is a top view of the fixture of FIG. 5 looking in the direction of arrows 7—7 and shown mounted on a grinding machine.

Referring now to FIGS. 5 through 7, there is shown a grinding fixture 70 which holds cutter 20 during the machining of the teeth of the cutter. Cutter 20 may be advanced in a direction towards or opposite arrows 76 and 77 and may also be rotated in the direction of arrow 80 or opposite thereof (FIG. 7). Arrow 76 is perpendicular to arrow 77. Thus, cutter 20 may be moved in relationship to a grinding wheel so as to finish machining the teeth on the cutter. Fixture 70 will be described prior to describing the method of machining the teeth of cutter 20.

Grinding fixture 70 has a base 71 (FIG. 5) with a support plate 72 pivotally mounted thereto by pivot bolt 74 (FIG. 7). An arcuate wear strip 73 is mounted atop base 71 by a plurality of fastening devices 79. A support plate 72 is spaced slightly above base 71 and rides on wear strip 73 which has an upper machined polished surface. Thus, support 72 may be pivoted about bolt 74 in a direction towards or opposite arrow 80 in a relatively frictionless manner. A housing 75 is mounted atop support 72 and recieves cutter 20.

Base 71 has a pair of depending tongues 81 positioned at either end which project into the conventional slot formed in a grinding machine. Such a grinding machine is known as a "Cincinnati Number Two Cutter and Tool Grinder" produced by the Cincinnati Milling Machine Company of Cincinnati, Ohio 45209. Of course, other types of cutter grinders are available other than the Cincinnati Number Two model. A pair of T-bars 82 are also mounted to base 71 extending downwardly therefrom into the slots of the Cincinnati Number Two Cutter and Tool Grinder. Fastening devices are provided so as to tighten T-bars 82 upwardly towards base 71 thereby firmly securing fixture 70 to the cutter and tool grinder.

Fixedly mounted atop support 72 is plate 83 upon which plate 84 is movably mounted. Plate 84 is provided with a groove 86 for slidably receiving wedge 85 of plate 83. Bar 87 is fixedly mounted to the end of plate 84 and has a worm 89 rotatably mounted thereto which is threadedly received by plate 83. Knob 88 is fastened to the end of worm 89. By rotating knob 88, worm 89 is advanced into or out of plate 83 thereby causing relative motion between plate 84 and 83. Upon rotation of knob 88, worm 89 does not advance with respect to plate 84 but instead it advances with respect to plate 83. Rotation of knob 88 results in movement of plate 84 in a direction towards or opposite arrow 76 when housing 75 is positioned as shown in FIG. 7.

Plate 90 is fixedly mounted to plate 84 and has a wedge shaped portion 92 which fits into a complementary sized groove 93 formed in plate 91. Worm 94 is perpendicular to worm 89 and is threadedly received by plate 90 being rotatably mounted to bar 96 which is fixedly mounted to plate 91. Knob 95 is mounted to the end of worm 94 so as to allow rotation of the worm thereby causing plate 91 to move with respect to plate 90 in a direction toward or opposite of arrow 77.

Housing 75 is fixedly mounted atop plate 91 and bearingly receives shaft 97 which has a ring shaped cap 98 and a mounting plate 99 fixedly mounted to the opposite ends thereof. A handle 100 is mounted to cap 98 to allow rotation of shaft 97 and mounting plate 99. Cutter 20 is mounted to plate 99 by a plurality of bolts extending through holes 22 (FIG. 3) of the cutter and being threadedly received by the plate. Plate 99 is provided with a key for fitting within slot 23 for locating the cutter on the plate.

Figure 4:
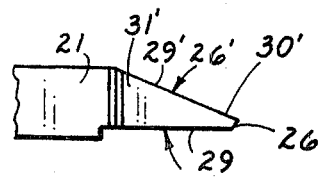
FIG. 4 is a cross sectional view taken along line 4—4 and viewed in the direction of the arrows of FIG. 3.

As described in U. S. Pat. No. 2,586,451 issued to Wilhaber, two cutters are required for the cutting of the gear. One of the cutters has a left hand cutting surface whereas the second cutter has a right hand cutting surface. Cutter 20 shown throughout the drawings herein is a right hand cutter. For example, in FIG. 3 a right hand cutter is shown with the cutting edge 29' and cutting surface 31' shown on the right side of each tooth as viewed from the front of the surface which corresponds to surface 30'. For a left hand cutter, the cutting surface or cutting edge is positioned on the left side of the tooth as viewed from the side of the cutter corresponding to surface 30' (FIG. 4). To align the cutting edge of each tooth to be sharpened, a right hand locator 102 and a left hand locator 103 (FIG. 5) are mounted to housing 75. Locator 102 will be described it being understood that a similar description applies to locator 103. Locator 102 has a cylindrical housing 104 mounted to housing 75. Housing 104 slidably receives rack 105. A spring 105' is positioned within housing 104 urging the outer end of rack 105 into one of the holes 101 which are positioned circumferentially around cap 98. If cutter 20 has 24 teeth spaced 15° apart, then cap 98 is provided with 24 holes 101 which are spaced 15° apart. Knob 107 is mounted on a threaded shaft which is in meshing engagement with rack 105. By rotating knob 107 in the direction of arrow 108, the rack is withdrawn into the housing thereby disengaging cap 98. Latch 106 is pivotally mounted to housing 104 and has an end 110 for lockingly engaging a slot provided in knob 107. To lock rack 105 in the unengaged position, cap 107 should be rotated in the direction of 108 thereby retracting the Number Two Cutter and Tool Grinder. Thus, the pin of locator 115 is engaged with a hole provided in plate 72. By releasing locator 115 and pivoting housing 75 about pivot bolt 74 through an angle 117 of 90°, then locator 116 may be engaged with plate 72 thereby lockingly positioning cutter 20 with respect to the Cincinnati Number Two Cutter and Tool Grinder grinding wheel. To prevent metal fragments from interferring with the sliding motion of plate 72 with respect to wear strip 73, a cleaning pad 118 is mounted to plate 72 and has a downwardly extending felt strip in contact with wear strip 73. A similar cleaning pad is positioned on the opposite side of plate 72 and is not shown in FIG. 7 for sake of clarity.

The method of repairing a used gear cutter wheel comprises the main steps of removing portions of the old used gear cutter teeth, attaching pieces of metal to the gear cutter wheel in place of the removed portions and then re-machining the old teeth and new pieces of metal to final teeth form. The gear cutter wheel 20 is first located and clamped onto the grinding fixture 70 which has been previously located and clamped onto a cutter and tool grinder machine. In the event that gear cutter wheel 20 is a right hand cutter, then left hand locator 103 is disengaged and right hand locator 102 is engaged with cap 98. Wheel 20 is secured to mounting plate 99 by bolts which extend through holes 22 (FIG. 3). Gear cutter wheel 20 is mounted to plate 99 so that the beveled front surface 30' of each tooth faces away from plate 99. In the event that a left hand gear cutter wheel is to be machined then right hand locator 102 is disengaged and left hand locator 103 is engaged with cap 98. With the cutter 20 and housing 75 pivoted to the position as shown in FIG. 7, the gear cutter wheel is advanced towards grinding wheel 130 by rotating knob 88. Thus, the forward leading portion 31' of the top tooth of cutter 20 aligned with grinding wheel 130 is removed. The gear cutter wheel is then backed away from grinding wheel 130 and locator 102 is disengaged from cap 98. Cap 98 is then rotated in the direction of arrow 78 (FIG. 5) until the adjacent tooth to the tooth just machined is located and aligned with grinding wheel 130. Locator 102 is then engaged with cap 98 and the cutter is advanced toward grinding wheel 130 removing the forward portion of the tooth. This process is repeated until all of the forward leading portions of the teeth have been removed.

Figure 8:
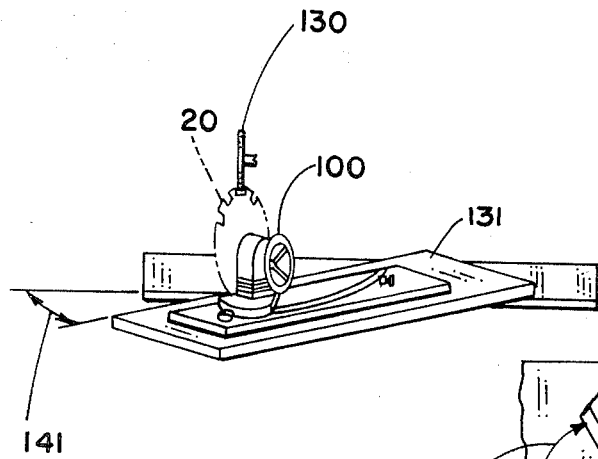
FIG. 8 is a symbolic diagram of the positioning of the gear cutter wheel with respect to the grinding wheel for the machining of surface 31'.
Figure 9:
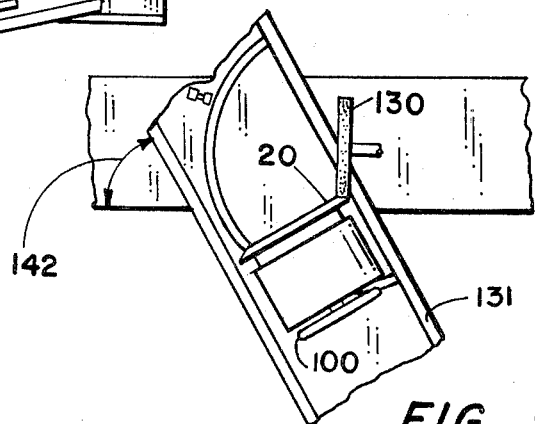
FIG. 9 is a symbolic diagram of the positioning of the gear cutter wheel with respect to the grinding wheel for the machining of surface 30'.
Figure 10:
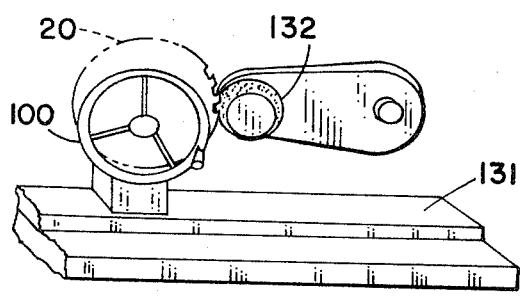
FIG. 10 is a symbolic diagram of the positioning of the gear cutter wheel with respect to the grinding wheel for the machining of surface 29.
Figure 11:
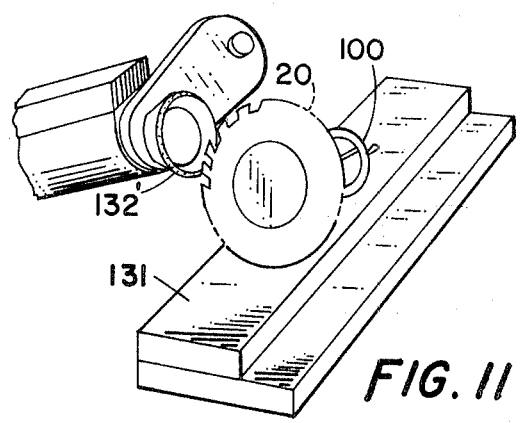
FIG. 11 is a symbolic diagram of the positioning of the gear cutter wheel with respect to the grinding wheel for the machining of the circumferential edge.

Cutter 20 is then removed from grinding fixture 70 and mounted to welding fixture 30 as previously described. A piece of metal is then attached to the gear cutter wheel at each space previously occupied by the forward portion of each tooth. The pieces of metal are attached by welding. Thus, for a gear cutter wheel having 24 teeth, 24 metal inserts would be attached to the gear cutter wheel. Cutter 20 is then removed from the welding fixture and mounted back onto grinding fixture 70 for the final machining. The final machining step includes a number of sub-steps. First, cutting surface 31' (FIG. 4) and cutting edge 29' are machined into each tooth. This is accomplished by rotating the bed 131 of the machine to which grinding fixture 70 is mounted through an angle corresponding to the angle of cutting surface 31'. Knob 88 may then be rotated so as to cause cutter 20 to move towards and away from grinding wheel 130. Locator 102 is used to position each tooth adjacent to grinding wheel 130 so that the cutting surface of each tooth is eventually machined. For example, if for a left hand cutter 20 the included angle between surface 31' and surface 29 is 70°, then bed 131 would be rotated through an angle 141 (FIG. 8) of 70° in the direction of arrow 80 (FIG. 7) with housing 75 being located in the position as shown in FIG. 7. The tool and grinder machine is designed to rotate bed 131 with respect to wheel 130. Thus, with wheel 130 in the position shown, bed 131 along with fixture 70 would be rotated 70° to machine surface 31'. Next, the bed 131 is pivoted back to the position shown in FIG. 7. Then, the beveled front face 30' (FIG. 4) is formed into the old teeth and inserts of metal by circle grinding the cutter. This is accomplished by pivoting housing 75 through angle 117 (FIG. 7) of 90° until plate 72 is engaged by locator 116. Bed 131 is then rotated in the direction opposite of arrow 80 through an angle equal to 90 degrees less the angle of intersection formed between surface 30' and surface 29 represented by angle 26' (FIG 4). For example, if angle 26' is equal to 21° 30 inches. Then bed 131 would be rotated through an angle 142 (FIG. 9) of 68° 30 inches. Cutter 20 is then moved toward grinding wheel 130 so as to form surface 30'. Next, surface 29 is ground so as to form a recess in the back of each new tooth. This is accomplished by positioning housing 75 in the position shown in FIG. 7 so as to engage plate 72 with locator 115. Grinding wheel 132 shown in FIG. 7 and 10, is positioned so as to allow grinding surface 133 of the grinding wheel to engage the back portion 29 of the gear. Handle 100 is slowly rotated so as to force cutter 20 past the grinding wheel 132. In addition, handle 100 is rotated during the circle grinding of beveled front face 30'. Next, the diameter of the gear cutting wheel 20 is reduced by positioning housing 75 in a right hand position so as to allow locator 116 to engage plate 72. A cup grinding wheel 132' of the gear and cutter machine is then positioned against the outer diameter of cutter 20 so as to reduce cutter 20 to the desired diameter. Handle 100 is slowly rotated so as to rotate cutter 20 past the cup grinding wheel shown in FIG. 11. Bed 131 is then rotated so as to allow grinding of the outer radiused edge 26 of the cutter grinding wheel. Handle 100 is slowly rotated as cutter 20 is forced past the grinding wheel. In addition, back relief 27 is formed by moving each tooth towards and away from the grinding wheel. Many variations are contemplated and included in the above method. For example, cutter 20 may be located in a variety of positions by positioning bed 131, the grinding wheel and housing 75. The above method is only one possible way to re-machine the cutter wheel.

The invention claimed is:

1. A method of repairing a used gear cutter wheel, said gear cutter wheel having a plurality of teeth arranged around its periphery with each of said teeth having a beveled front face, opposite parallel side surfaces and a tip surface, each of said teeth having side edges at opposite sides formed at the junctures of its front face and its opposite side surfaces and having a tip cutting edge formed at the juncture of its front face and its tip surface, each of said teeth being relieved back of its front face, one of said opposite parallel side surfaces is a cutting surface intersecting said front face forming a cutting edge, comprising the steps of:

attaching pieces of metal to said wheel; and, machining said pieces of metal into new gear cutter wheel teeth subsequent to said attaching step;

removing at least portions of the old used teeth from said wheel prior to said attaching step; and wherein:

said pieces of metal are positioned during said attaching step in the spaces previously occupied by the removed portions of said old used teeth;

said machining step includes the sub-steps of:

machining said cutting surface and cutting edge for each of said new teeth;

circle grinding said beveled front face for each of said new teeth; next, grinding a recess in the back of each of said new teeth; next, reducing the diameter of said gear cutting wheel; next, grinding said tip surface of said gear cutting wheel; and next, grinding the junction of said tip surface and one of said opposite parallel side surfaces forming a back relief;

said removing step includes grinding only the forward cutting portion of each old tooth; and, said attaching step includes welding said pieces of metal to said wheel.

2. The method of claim 1 and comprising the additional steps of:

holding said gear cutter wheel on a welding machine during said attaching step;

holding said gear cutter wheel on a grinding machine during said machining step; and, positioning a tooth at a time adjacent to a cutting tool of said grinding machine so that only a single tooth is ground at a time.

* * * * *